United States Patent

Lanius, Jr.

[15] 3,699,841
[45] Oct. 24, 1972

[54] DRILLING AND REAMING SCREW
[72] Inventor: James Curtis Lanius, Jr., Elgin, Ill.
[73] Assignee: Illinois Tool Works Inc., Chicago, Ill.
[22] Filed: March 31, 1971
[21] Appl. No.: 129,829

[52] U.S. Cl. .................................. 85/41, 408/224
[51] Int. Cl. ............................................ F16b 25/00
[58] Field of Search ............... 85/41, 47, 43; 408/224

[56] References Cited

UNITED STATES PATENTS

| 252,704 | 1/1882 | Southwick | 408/224 |
| 2,372,719 | 4/1945 | Freese | 408/224 |
| 2,389,909 | 11/1945 | Hofbaver | 408/224 |
| 3,358,548 | 12/1967 | Dyslin | 85/47 |

Primary Examiner—Marion Parsons, Jr.
Attorney—Robert W. Beart et al.

[57] ABSTRACT

A self drilling screw for drilling and fastening a first work member to a relatively harder second work member. A drill tip having material removing members formed thereon and situated between drilling flutes on the tip. The material removing members becoming inoperative as a result of breaking on contact with the second relatively hard work member so as to permit threads to be formed in the second work member.

1 Claim, 4 Drawing Figures

PATENTED OCT 24 1972

3,699,841

INVENTOR.
James Curtis Lanius, Jr.
BY
His Att'ys

DRILLING AND REAMING SCREW

This invention relates to a drill screw, and more particularly relates to a screw adapted to be used in fastening two or more panels in superposed relationship.

It is quite common in fastening two panels together to provide a pilot hole in the first panel with the pilot hole being greater than the major diameter of the screw threads. If such a pilot hole was not provided, the threads of the screw will engage the first panel and quite often will not permit the panels to be maintained in juxtaposed relationship since the rate of penetration of the screw into the second panel may be different than the rate of movement between the threads of the screw and a first panel. A current method of fastening two or more panels in superposed relationship utilizes wing-like elements on the shank to bore a hole in a first work member so that the threads on the screw will not engage this work panel. An example of such a fastener is shown in U.S. Pat. No. 3,358,548. The entering portion of such a fastener should be designed to insure that the point not be deteriorated from galling and burning and yet include pilot hole reaming portions which are delicately designed to break under certain conditions.

Accordingly, it is an object of this invention to provide a screw threaded fastener which is capable of counterboring a hole in a first workpiece while protecting against deterioration of a drilling tip.

It is a further object of this invention to provide a drilling and reaming threaded fastener, including wing-like elements on the shank which are relatively strong and yet designed in such a manner as to be removed from the shank upon contact with a relatively hard workpiece.

Still other objects and advantages of this invention will become apparent to those skilled in the art when the specification and claims are read in connection with the accompanying drawings wherein:

Figure 1:
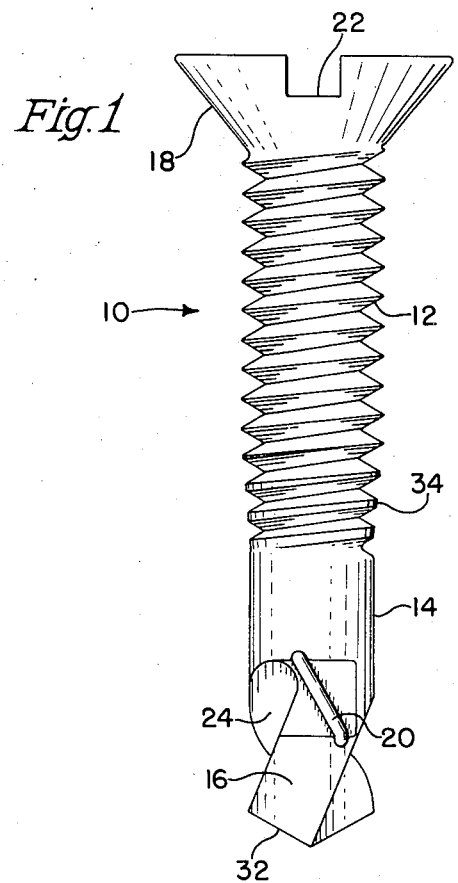
FIG. 1 is an elevational view of a screw embodying the principles of this invention.

Referring now to the drawings wherein similar parts bear similar numerals, a screw 10 embodying the principles of the present invention includes a shank 12 having a threaded portion 14 along a substantial portion of its extent, a drilling tip 16, drilling flutes 24 associated with the drilling tip and a head 18 provided with suitable driving means 22. The tip 16 in the embodiment disclosed is similar to the type disclosed in U.S. Pat. No. 3,125,923, but for purposes of the present invention drill tips of other configurations can be used with equal facility. Similarly, the threaded portion 14 of the shank 12 is shown as having thread forming means 34 associated therewith. Once again this particular feature, while desirable, could be substituted with other well-known methods of cutting or forming threads.

The drilling tip 16 is provided with wings 20 which are struck from the material of shank 12 by suitable means such as pinch pointing. The wings 20 extend radially outwardly from the shank a distance equal to or greater than the major diameter of the threaded portion 14.

Figure 2:
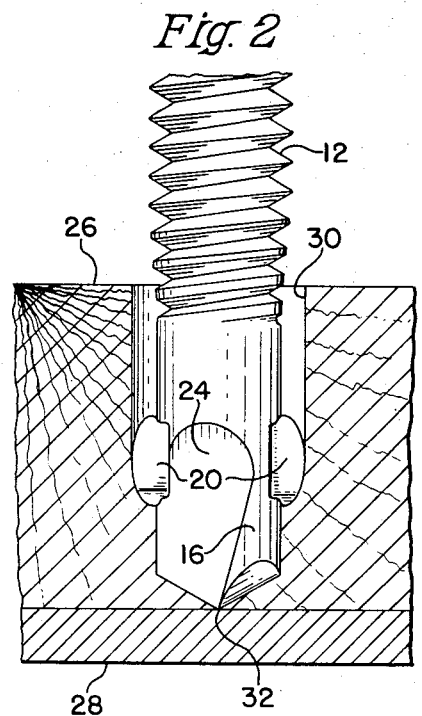
FIGS. 2 and 3 are elevational views and partial sections showing the application of a screw embodying the principles of the present invention to a pair of adjacent panels.
Figure 3:
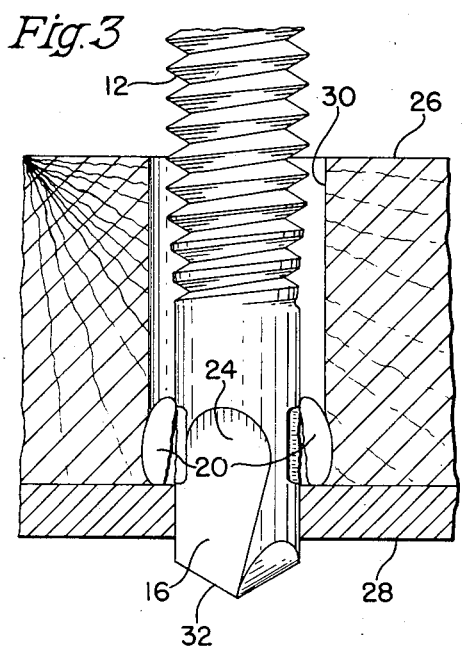

The operation of the screw 10 can best be understood by referring to FIGS. 2 and 3 wherein the screw is used to fasten two superimposed panels 26 and 28 of dissimilar materials. The first panel or work member 26 is preferably softer than the second work panel or member 28.

As the screw is applied through axial pressure on the head 18 the drilling tip 16 will create a bore in the panel 26 of approximately the same diameter as the diameter of the drilling tip. Almost simultaneously the wings 20 will enlarge the diameter of the bore formed by the drilling tip to form a pilot hole 30 thus the threaded portion 12 is free to move through the panel 26 without interfering with the drilling of harder panel 28.

When the tip 16 has penetrated the panel 28, the wings 20 will contact this hard panel and be separated from the shank of the fastener as shown in FIG. 3.

It is important to note that the wings 20 are positioned between the flutes 24 and generally do not extend upwardly beyond the uppermost portion of the drilling flutes 24. This unique positioning of wings thus enables the chips to flow freely in the flutes without obstruction. If these wings were positioned above the flutes there would be a distinct tendency for the wings 20 to prevent drill chips from ejecting properly and thus causing failure of the drill point from galling and burning.

Figure 4:
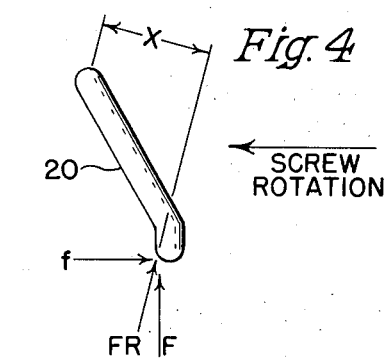
FIG. 4 is an enlarged elevational view of the reamer wings of the present invention showing particular force relationships acting thereon.

It is to be further noted that the wings 20 extend at an angle to a plane which includes the longitudinal axis of the screw. To make a vertical wing break off properly upon contacting the hard workpiece 28, there must be a maximum thickness that in turn leaves the wing relatively weak to ream out heavy wood, such as oak and mahogany. This results in wing breakage before the point contacts the metal surface or the hard surface 28 and produces an even greater blocked region. This deficiency has been overcome by the angular orientation of the wings 20 to the shank as described above. FIG. 4 illustrates that the angular orientation of such a wing 20 results in a moment arm, X, in cooperation with a resultant force, FR, which is determined by the impact force F, and frictional force, $f$. This force diagram shows that, with all forces being equal, upon impact with the metal the breaking moment on the wing of the present invention is much greater than that on a wing positioned vertically on the shank of a fastener. This allows an increase in strength of the tilted wing to prevent breakage while reaming hard woods and still enabling it to break properly on impact.

Thus, it has been shown that the provision of frangible wings 20 between drilling flutes 24, which wings are also inclined towards the direction of rotation of the fastener, will enable a pair of dissimilar workpieces to be fastened in juxtaposed relationship. Screws of the type described by this invention are ideally suited for fastening hard wood panels to a still harder material, such as metal, without deterioration of the drilling tip due to improper ejection of chips.

Thus, it is apparent that there has been provided in accordance with the invention a drilling and reaming screw that fully satisfies the objects and advantages set forth above. While the invention has been described in conjunction with a specific embodiment thereof, it is evident that many alternatives, modifications and variations will be apparent to those skilled in the art in light of the foregoing description. Accordingly, it is intended to embrace all such alternatives, modifications and variations that fall within the spirit and scope of the appended claims.

I claim:

1. A screw adapted to fasten two or more juxtaposed work members, including a threaded shank, a driving head, a drilling tip including a plurality of cutting edges with associated drilling flutes, material removing wings extending radially outwardly from and frangibly connected to the drilling tip, said wings being located between the drilling flutes and between the lowermost portion of the drilling tip and the uppermost portion of the drilling flutes, the wings being angularly disposed in the direction of rotation of the screw.

* * * * *